Dec. 28, 1926.

H. S. VALENTINE

SAFETY DRIVE

Filed August 28, 1923

1,611,963

Inventor:
Herbert S. Valentine,
by his Attorneys,
Howson & Howson.

Patented Dec. 28, 1926.

1,611,963

UNITED STATES PATENT OFFICE.

HERBERT S. VALENTINE, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

SAFETY DRIVE.

Application filed August 28, 1923. Serial No. 659,778.

One object of this invention is to provide a relatively simple, conveniently adjustable automatic safety device particularly designed to be included in and form part of the train of gears on a hoist, for automatically disconnecting the source of power from the load in the event of the latter exceeding a predetermined amount, and more particularly, it is desired to provide a safety device which shall be so placed in the gear train as to permit of relatively light working pressures to the square inch between the coacting friction surfaces, so that when these slip or move relatively to each other, there shall not be that sudden drop in power transmitting capacity which occurs under similar conditions when the pressure between the coacting parts is relatively great.

The invention further contemplates the insertion of a safety device in a gear train at that point where the gears have a maximum speed, under which conditions it is possible to operate said device with relatively low pressure between its coacting friction surfaces, thus giving a practically continuous constant torque when said surfaces slip or move relatively to each other.

Figure 1:
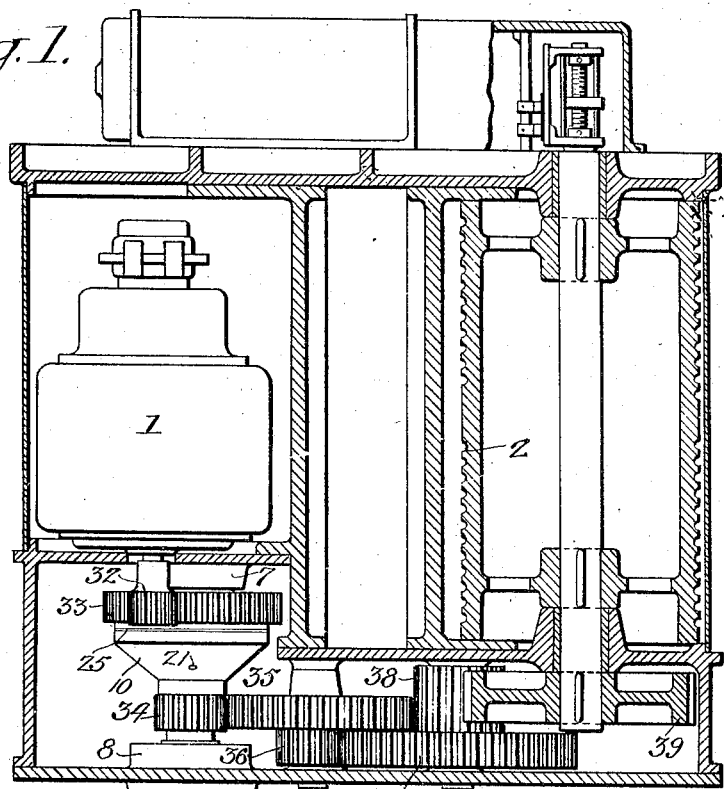
Figure 2:
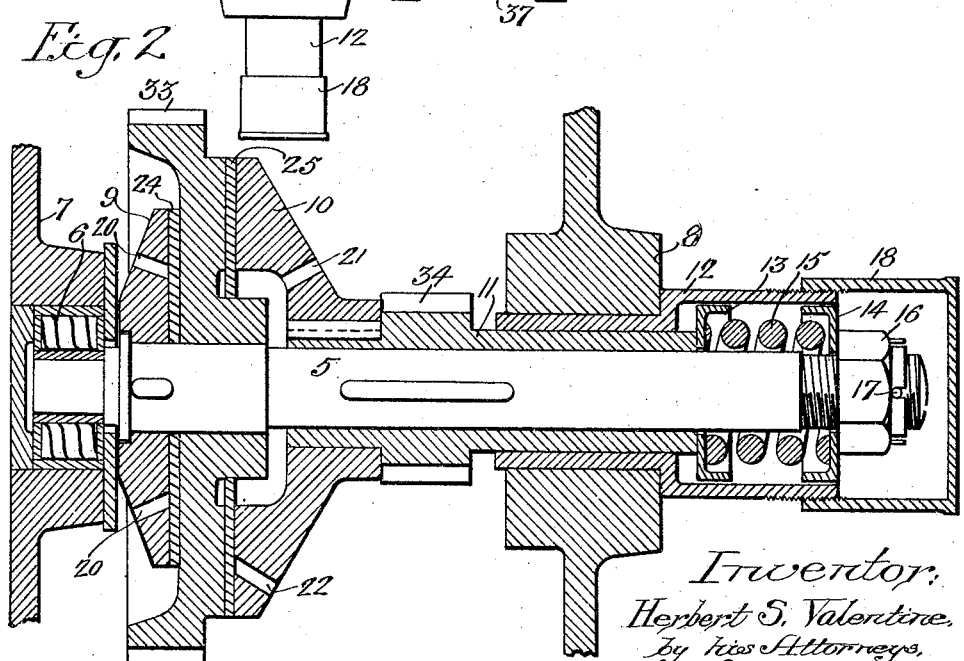

These objects and other advantageous ends, I attain as hereinafter set forth, reference being had to the accompanying drawings in which, Fig. 1 is a sectional plan illustrating my invention as applied to a well known form of hoist; and, Fig. 2 is an enlarged vertical section further illustrating my invention.

In the above drawings, 1 represents an electric motor connected through a gear train 32—39 to the drum 2 of a hoist, and in accordance with my invention I insert my safety device in said gear train immediately adjacent said electric motor where the gears operate at a maximum speed. With this idea in view, the pinion 32 on the armature shaft of the motor meshes with the gear 33 and my safety device is included between this latter gear and the next succeeding pinion 34 of the gear train. For this purpose, I provide a shaft 5 having one end supported in suitable anti-friction bearings 6 carried by the fixed structure 7 and supported indirectly as hereafter explained in a bearing provided by a second fixed structure 8 adjacent the structure 7. Said shaft has keyed to it a plate 9 having a flat face extending parallel with and immediately adjacent the corresponding flat face formed on one side of the gear 33. Said gear is mounted to run loosely on the shaft 5 and its second face is likewise flat, having adjacent it the flat face of a second plate 10. This latter plate is keyed or otherwise rigidly fixed to an elongated sleeve 11 splined to the shaft 5 so as to be rotated therewith while free to move longitudinally thereon to a limited extent. The pinion 34 is fixed to this sleeve, in the present case integrally, and said sleeve extends through a shouldered bushing 12 mounted in the fixed structure 8 so as to be free to rotate therein. A flanged ring 13 is mounted on the shaft 5 so as to bear against the end of the sleeve 11 and between this and a second flanged ring 14 is mounted a relatively heavy coiled spring 15 which with said rings is confined within the outer end of the bushing 12. The adjacent extremity of the shaft 5 is threaded for an adjustable nut 16 bearing against the outer one of the rings 14 and capable of being locked in any given position by pin or key 17 passing through the shaft end. This adjustable nut and the parts immediately adjacent thereto are inclosed by a cap 18 threaded on the sleeve 12.

Between the adjacent flat face of the gear 33 and the two plates 9 and 10 are mounted rings or annular plates 24 and 25 of suitable friction material such as parchmentized fibre, brake lining or the like, so that when the nut 16 is set up to compress the spring 15, the latter acts through the sleeve 11, gear 34, and plate 10 to frictionally press the latter toward the gear 33 and the gear 33 toward the plate 9 with a definite and relatively light pressure per square inch. Under these conditions, when power is applied to the gear 33, it is normally transmitted to the pinion 34, the various parts being designed to run in oil, for which purpose the two plates 9 and 10 are formed with lubricating channels 20, 21, 22 to insure the free delivery of lubricant to the rings 24 and 25.

When connected in the gear train of a hoist immediately adjacent the driving motor 1 as shown in Fig. 1, said motor when in operation will turn the drum and raise the load attached to the cable wound thereon. The pressure between the coacting friction surfaces in the above described device is relatively low, and this is permissible by reason of the fact that said device is connected in the gear train at a point thereof immediately adjacent the driving motor where the speed of the power transmitting elements is high. As a consequence, when relative motion occurs between the gear 33 and its coacting friction surfaces by reason of an abnormal load on the hoist, there is no sudden and excessive drop of power transmitting capacity such as would occur if slippage occurred when the pressure per square inch between the coacting friction surfaces was relatively high. When the device operates therefore the torque is practically continuous and constant.

I claim:—

1. In combination, a high speed shaft; a low speed shaft; and means interconnecting the same comprising a clutch shaft; a sleeve splined thereto; a gear fixed to said sleeve and operatively associated with said low speed shaft; a second gear loosely mounted on the clutch shaft and operatively associated with said high speed shaft; two plates mounted to turn with the clutch shaft and positioned to frictionally cooperate with opposite sides of the second gear; and a spring operative through the sleeve to force the plates into gripping engagement with the second gear, whereby the power transmitting capacity of said high speed shaft is substantially unaffected by slippage of said plates.

2. In combination, a high speed shaft; a low speed shaft; and means for interconnecting the same comprising a clutch shaft; a sleeve splined to said clutch shaft and including an integral gear operatively associated with said low speed shaft; a second gear loosely mounted on the clutch shaft and operatively associated with the high speed shaft; two friction plates respectively cooperating with opposite sides of said second gear and so mounted as to turn with said first-mentioned gear; and a spring operative on the sleeve for maintaining said plates and the second gear in frictional engagement, whereby the power transmitting capacity of said high speed shaft is substantially independent of relative movement between said plates and said second gear.

3. In combination, a high speed shaft; a low speed shaft, and means for interconnecting the same comprising a clutch shaft; a plate mounted on said clutch shaft; a gear loose on the shaft and frictionally engaging said plate, said gear being operatively associated with said high speed shaft; a sleeve splined to said clutch shaft; a second plate fixed to the sleeve in position to frictionally engage the second face of said gear; a second gear on said sleeve, said second gear being operatively associated with said low speed shaft; and a spring operative on the sleeve to force said plates and first gear into frictional engagement; whereby the power transmitting capacity of said high speed shaft is substantially independent of relative movement between said plates and said first-mentioned gear.

4. In combination, a high speed shaft; a low speed shaft; and means for operatively associating the same comprising a clutch shaft; a casing providing a journal for said clutch shaft, the latter projecting outside of said casing; a sleeve splined to said clutch shaft; a gear loose on the clutch shaft and operatively associated with said high speed shaft; two plates mounted to frictionally engage opposite faces of said gear, one of said plates being operatively associated with said sleeve; a gear on the sleeve operatively associated with said low speed shaft; an adjustable member on the portion of the clutch shaft outside of the casing; and a spring connected between said adjustable member and the adjacent end of the sleeve, the speed of said first-mentioned shaft being such that the pressure of said plates on said first-mentioned gear is relatively low, whereby the power transmitting capacity of said high speed shaft is substantially independent of relative movement between said plates and said first-mentioned gear.

HERBERT S. VALENTINE.